(12) United States Patent
Volkovs et al.

(10) Patent No.: US 11,030,415 B2
(45) Date of Patent: Jun. 8, 2021

(54) LEARNING DOCUMENT EMBEDDINGS WITH CONVOLUTIONAL NEURAL NETWORK ARCHITECTURES

(71) Applicant: The Toronto-Dominion Bank, Toronto (CA)

(72) Inventors: Maksims Volkovs, Toronto (CA); Tomi Johan Poutanen, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 84 days.

(21) Appl. No.: 16/432,461

(22) Filed: Jun. 5, 2019

(65) Prior Publication Data
US 2019/0286704 A1 Sep. 19, 2019

Related U.S. Application Data

(63) Continuation of application No. 15/863,612, filed on Jan. 5, 2018, now Pat. No. 10,360,303.
(Continued)

(51) Int. Cl.
*G06F 40/289* (2020.01)
*G06F 40/30* (2020.01)
(Continued)

(52) U.S. Cl.
CPC .......... *G06F 40/30* (2020.01); *G06F 40/289* (2020.01); *G06N 3/04* (2013.01); *G06N 3/0454* (2013.01);
(Continued)

(58) Field of Classification Search
CPC ........ G06F 40/30; G06F 40/169; G06F 40/40; G06F 16/353; G06F 16/583;
(Continued)

(56) References Cited

U.S. PATENT DOCUMENTS

RE46,310 E      2/2017  Hoffberg et al.
9,659,560 B2 *  5/2017  Cao ......................... G06N 3/088
(Continued)

FOREIGN PATENT DOCUMENTS

CN          106844765 A      6/2017

OTHER PUBLICATIONS

Abadi, M. et al., "Tensorflow: Large-Scale Machine Learning on Heterogeneous Distributed Systems," Preliminary White Paper, Nov. 9, 2015, pp. 1-19.
(Continued)

*Primary Examiner* — Vijay B Chawan
(74) *Attorney, Agent, or Firm* — Fenwick & West LLP

(57) ABSTRACT

A document analysis system trains a document embedding model configured to receive a set of word embeddings for an ordered set of words in a document and generate a document embedding for the document. The document embedding is a representation of the document in a latent space that characterizes the document with respect to properties such as structure, content, and sentiment. The document embedding may represent a prediction of a set of words that follow the last word in the ordered set of words of the document. The document embedding model may be associated with a convolutional neural network (CNN) architecture that includes one or more convolutional layers. The CNN architecture of the document embedding model allows the document analysis system to overcome various difficulties of existing document embedding models, and allows the document analysis system to easily process variable-length documents that include a variable number of words.

20 Claims, 8 Drawing Sheets

Related U.S. Application Data

(60) Provisional application No. 62/443,626, filed on Jan. 6, 2017.

(51) Int. Cl.
  *G06N 3/04* (2006.01)
  *G06N 3/08* (2006.01)
  *G06F 40/284* (2020.01)

(52) U.S. Cl.
  CPC .............. *G06N 3/08* (2013.01); *G06N 3/084* (2013.01); *G06F 40/284* (2020.01)

(58) Field of Classification Search
  CPC ... G06F 16/9032; G10L 25/30; G06N 3/0454; G06N 3/088; G06N 3/082; G06N 3/0445; G06N 20/00
  USPC ..... 704/9, 203, 259, 232; 706/14, 16, 20, 27
  See application file for complete search history.

(56) References Cited

U.S. PATENT DOCUMENTS

| | | | | |
|---|---|---|---|---|
| 9,846,836 | B2* | 12/2017 | Gao | G06N 3/082 |
| 9,947,314 | B2* | 4/2018 | Cao | G06F 40/40 |
| 2012/0253792 | A1* | 10/2012 | Bespalov | G06F 16/353 |
| | | | | 704/9 |
| 2012/0310627 | A1* | 12/2012 | Qi | G06F 40/30 |
| | | | | 704/9 |
| 2015/0220833 | A1* | 8/2015 | Le | G06F 16/583 |
| | | | | 706/16 |
| 2015/0254555 | A1* | 9/2015 | Williams, Jr. | G06N 3/0454 |
| | | | | 706/14 |
| 2015/0363688 | A1* | 12/2015 | Gao | G06F 16/9032 |
| | | | | 706/27 |
| 2016/0110343 | A1* | 4/2016 | Kumar Rangarajan Sridhar | G10L 25/30 |
| | | | | 704/9 |
| 2016/0328388 | A1* | 11/2016 | Cao | G06F 40/169 |
| 2016/0329044 | A1* | 11/2016 | Cao | G06N 20/00 |
| 2018/0204120 | A1* | 7/2018 | Rei | G06N 3/0445 |

OTHER PUBLICATIONS

Bahdanau, D. et al., "Neural Machine Translation by Jointly Learning to Align and Translate," International Conference on Learning Representations, 2015, pp. 1-15.
Blei, D.M. et al., "Latent Dirichlet Allocation," Journal of Machine Learning Research, 2003, pp. 993-1022, vol. 3.
Chung, J. et al., "Empirical Evaluation of Gated Recurrent Neural Networks on Sequence Modeling," 2014, pp. 1-9.
Collobert, R. et al., "Natural Language Processing (Almost) From Scratch," Journal of Machine Learning Research, JMLR, 2011, pp. 2493-2537, vol. 12.
Conneau, A. et al., "Very Deep Convolutional Networks for Text Classification," 15.sup.th Conference of the European Chapter of the Association for Computational Linguistics, Proceedings of the Conference: vol. 1, Long Papers, Apr. 3-7, 2017, pp. 1107-1116.
Dai, A. M. et al., "Document Embedding with Paragraph Vectors," 2015, pp. 1-8.
Dauphin, Y.N. et al., "Language Modeling with Gated Convolutional Networks," Proceedings of the 34.sup.th International Conference on Machine Learning, PMLR, 2016, vol. 70.
Deerwester, S. et al., "Indexing by Latent Semantic Analysis," Journal of the American Society for Information Science, Sep. 1990, pp. 391-407, vol. 41, No. 6.
Elman, J. L., "Finding Structure in Time," Cognitive science, 1990, pp. 179-211, vol. 14, No. 2.
Graves, A. et al., "Speech Recognition with Deep Recurrent Neural Networks," 2013 IEEE International Conference on Acoustics, Speech, and Signal Processing, ICASSP, May 26-31, 2013, pp. 6645-6649.
Harris, Z.S., "Distributional Structure," Linguistics Today, 10, 1954, pp. 146-162.
He, K. et al., "Deep Residual Learning for Image Recognition," 2015, pp. 1-12.
He, K. et al., "Deep Residual Learning for Image Recognition," 2016 IEEE Conference on Computer Vision and Pattern Recognition, 2016, pp. 770-778.
Hill, F. et al., "Learning Distributed Representations of Sentences from Unlabelled Data," 2016, 11 pages.
Hinton, G. et al., "Deep Neural Networks for Acoustic Modeling in Speech Recognition: The Shared Views of Four Research Groups," IEEE Signal Processing, Nov. 2012, pp. 82-97, vol. 29, No. 6.
Hochreiter, S. et al., "Long Short-Term Memory," Neural Computation, 1997, pp. 1735-1780, vol. 9, No. 8.
Hofmann, T., "Probabilistic Latent Semantic Indexing," In Research and Development in Information Retrieval, Sigir Forum, Fall 1999, pp. 50-57, vol. 33, No. 1.
Inan, H. et al., "Tying Word Vectors and Word Classifiers: A Loss Framework for Language Modeling," International Conference on Learning Representations, ICLR, 2017, pp. 1-13.
Ioffe, S.et al., "Batch Normalization: Accelerating Deep Network Training by Reducing Internal Covariate Shift," International Conference on Machine Learning, 2015, pp. 1-11.
Jozefowicz, R. et al., "Exploring the Limits of Language Modeling," 2016, pp. 1-11.
Kalchbrenner, N. et al., "A Convolutional Neural Network for Modelling Sentences," Association for Computational Linguistics, 2014, pp. 1-11.
Kim, Y. et al., "Convolutional Neural Networks for Sentence Classification," Proceedings of the 2014 Conference on Empirical Methods in Natural Language Processing (EMNLP), Oct. 25-29, 2014, pp. 1746-1751.
Kim, Y., "Convolutional Neural Networks for Sentence Classification," 2014, pp. 1-6.
Kingma, D. et al., "A Method for Stochastic Optimization," Published as a conference paper at ICLR 2015, 2014, pp. 1-15.
Kiros, R. et al., "Skip-Thought Vectors," NIPS, 2015, pp. 1-11.
Kiros, R.et al., "Skip-Thought Vectors," Neural Information Processing Systems, 2015, pp. 1-9.
Krizhevsky, A. et al., "Imagenet Classification with Deep Convolutional Neural Networks," NIPS, 2012, pp. 1-9.
Lai, S. et al., "Recurrent Convolutional Neural Networks for Text Classification," Proceedings of the Twenty-Ninth AAAI Conference on Artificial Intelligence, 2015, pp. 2267-2273.
Le, Q. V. et al., "Distributed Representations of Sentences and Documents," in ICML, 2014, pp. 1-9.
Lin, Z. et al., "A Structured Self-Attentive Sentence Embedding," International Conference on Learning Representations, ICLR, 2017, pp. 1-15.
Maas, A. L. et al., "Learning Word Vectors for Sentiment Analysis," Association for Computational Linguistics, 2011, pp. 1-9.
Maas, A. L. et al., "Rectifier Nonlinearities Improve Neural Network Acoustic Models," ICML, 2013, pp. 1-6.
McAuley, J.J. et al., "From Amateurs to Connoisseurs: Modeling the Evolution of User Expertise Through Online Reviews," World Wide Web, WWW 2013, ACM, May 13-17, 2013, pp. 1-11.
Merity, S. et al., "Pointer Sentinel Mixture Models," 2016, pp. 1-13.
Mesnil, G. et al., "Ensemble of Generative and Discriminative Techniques for Sentiment Analysis of Movie Reviews," Accepted as a Workshop Contribution at ICLR 2015, 2014, pp. 1-5.
Mikolov, T. et al., "Distributed Representations of Words and Phrases and Their Compositionality," Neural Information Processing Systems, 2013, pp. 1-9.
PCT International Search Report and Written Opinion, PCT Application No. PCT/CA2018/050012, dated Apr. 9, 2018, 8 pages.
Pennington, J. et al., "Glove: Global Vectors for Word Representation," Proceedings of the 2014 Conference on Empirical Methods in Natural Language Processing (EMNLP), Oct. 25-29, 2014, pp. 1532-1543.
Press, O. et al., "Using the Output Embedding to Improve Language Models," 2016, pp. 1-7.

(56) References Cited

OTHER PUBLICATIONS

Srivastava, N. et al., "Dropout: a Simple Way to Prevent Neural Networks from Overfitting," Journal of Machine Learning Research, 2014, pp. 1929-1958, vol. 15, No. 1.
Vedaldi, A. et al., "Convolutional Neural Networks for Matlab," MM'15, ACM, Oct. 26-30, 2015, pp. 689-692.
Wang, S. et al., "Baselines and Bigrams: Simple, Good Sentiment and Topic Classification," Proceedings of the 50.sup.th Annual Meeting of the Association for Computational Linguistics, ACL, Jul. 8-14, 2012, pp. 90-94.
Zhou, B. et al., "Simple Baseline for Visual Question Answering," 2015, pp. 1-7.

* cited by examiner

LEARNING DOCUMENT EMBEDDINGS WITH CONVOLUTIONAL NEURAL NETWORK ARCHITECTURES

CROSS-REFERENCE TO RELATED APPLICATIONS

This application is a continuation application of U.S. application Ser. No. 15/863,612, filed Jan. 5, 2018, which claims the benefit of and priority to U.S. Provisional Application No. 62/443,626, filed Jan. 6, 2017, all of which are hereby incorporated by reference in their entirety.

BACKGROUND

This invention relates generally to document embeddings, and more particularly to generating document embeddings using a convolutional neural network architecture.

Online systems, such as content provider systems or recommendation systems, frequently have access to a significant number of documents. For example, a video publishing website may have access to reviews for videos written by users of the website. Online systems analyze information contained in the documents, such that the online system can perform various tasks based on this information. For example, the video publishing website may classify reviews into positive or negative reviews, and recommend videos associated with positive reviews to the users of the website. As another example, the video publishing website may retrieve reviews that are similar to a given review with respect to the content of the review.

Often times, it is advantageous for the online system to determine document embeddings that represent documents as numerical vectors in latent space. These representations (i.e., the documents embedding) may be used to characterize the document for various purposes. However, existing document embedding models suffer from difficulties related to computational efficiency and accuracy. For example, some existing models generate document embeddings based on very small subsets of words, and do not incorporate long-range semantic relationships in the document and may fail to accurately characterize the document as a whole. As another example, some existing models require a significant amount of computational power during both the training and inference process due to the structure of the models. As yet another example, some existing models require an iterative optimization process to generate document embeddings for new documents.

SUMMARY

A document analysis system trains a machine-learned document embedding model configured to receive a set of word embeddings for an ordered set of words in a document and generate a document embedding for the document. The set of word embeddings is a representation of the ordered set of words in a latent space. The document embedding is a representation of the document in a latent space that can characterize the document, directly or indirectly, with respect to properties such as structure, content, and sentiment. The distance between a pair of document embeddings may indicate a degree of similarity between the corresponding pair of documents. In one embodiment, the document embedding generated by the model represents a prediction of a set of words that follow the last word in the ordered set of words of the document.

The document embeddings can be used to generate inferences about, for example, characterizations of the documents. During the inference process, the document analysis system generates document embeddings for one or more documents using the document embedding model, and may perform a variety of tasks based on the generated embeddings. Specifically, for a given document, the document analysis system identifies the set of word embeddings for the ordered set of words. The set of word embeddings may be predetermined, or may be generated by applying a word embedding model to the ordered set of words. The document analysis system generates the document embedding by applying the document embedding model to the set of word embeddings for the document. The document analysis system may perform tasks such as sentiment or topic classification and information retrieval based on the generated document embeddings.

During the training process, the document analysis system trains the document embedding model using a training corpus of documents to reduce a loss function. In one embodiment, the loss function includes a prediction loss that represents a difference between estimated document embeddings generated by applying the document embedding model to word embeddings for a first subset of words in each training document, and word embeddings for a second subset of words subsequent to the first subset of words in the respective document. By reducing the prediction loss, the document embedding model learns a document embedding for an ordered set of words that represents the collection of words likely to come after the ordered set of words. In another embodiment, the loss function additionally includes a negative word loss for each document in the training batch that represents a penalty for estimated document embeddings that represent prediction of words that were not included in the respective training documents. By reducing the negative word loss, the document embedding is less likely to incorporate prediction of a set of words that were absent from the document.

The document analysis system reduces the loss function by repeatedly iterating between a forward pass step and a backpropagation step. During the forward pass step, the document analysis system generates the estimated document embeddings for the first subset of words by applying the document embedding model with an estimated set of parameters to the word embeddings for the first subset of words. During the backpropagation step, the document analysis system determines the loss function based on word embeddings for the second subset of words subsequent the first subset of words and the estimated document embeddings. The document analysis system updates the estimated set of parameters by backpropagating one or more error terms obtained from the loss function.

In one embodiment, the document analysis system trains a document embedding model with a convolutional neural network (CNN) architecture. The CNN architecture of the document embedding model includes one or more convolutional layers, in which the output at a convolutional layer is generated by applying one or more kernels each associated with a set of weights to subsets of the input at the previous layer. The output indicates the presence of features in the subsets of the input that are associated with the kernels of the convolutional layer. The CNN architecture of the document embedding model allows the document analysis system to overcome various difficulties of existing document embedding models, and allows the document analysis system to easily process variable-length documents that include a variable number of words.

In one embodiment, the document analysis system jointly trains the word embedding model along with the document embedding model. Specifically, the word embedding model is configured to receive an encoded word and generate the word embedding for the word. The word embedding model can be used to learn the relationship between an encoded word and the word embedding for the word to reduce the loss function of the document embedding model.

Specifically, during the forward pass step, the document analysis system generates estimated word embeddings for the first subset of words and the second subset of words in the training batch by applying the word embedding model with an estimated set of parameters to each encoded word. The word embeddings are used to generate the estimated document embedding for the first subset of words. During the backpropagation step, the document analysis system determines the loss function based on the estimated word embeddings for the second subset of words. The document analysis system updates the estimated set of parameters of the document embedding model and the word embedding model by backpropagating one or more error terms obtained from the loss function. During the inference process after the training process is completed, the document embedding model can be applied in parallel to subsets of word embeddings of a document that results in an order of magnitude faster than existing document embedding models with recurrent architectures.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
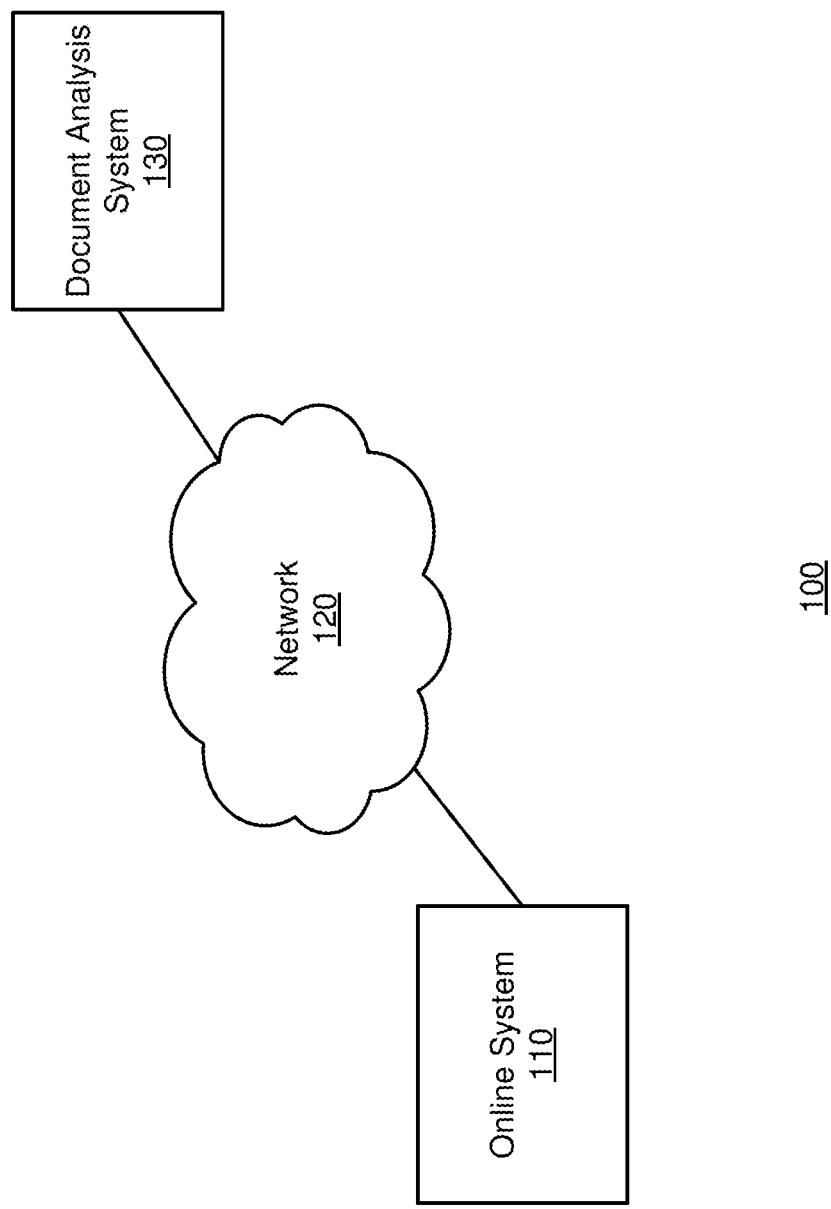
FIG. 1 is a high level block diagram of a system environment for a document analysis system, in accordance with an embodiment.

FIG. 1 is a high level block diagram of a system environment for a document analysis system 130, in accordance with an embodiment. The system environment 100 shown by FIG. 1 includes one or more client devices 116, a network 120, an online system 110, and a document analysis system 130. In alternative configurations, different and/or additional components may be included in the system environment 100.

The online system 110 is a system for providing various types of online services to users of client devices 116. The online system 110 may be, for example, a content provider system, a recommendation system, a recruiting system, and the like. For example, the online system 110 may be a video publishing website that manages a collection of videos online, where users of the website can view, share, and review videos on the website. The online system 110 may have access to a significant number of documents that when analyzed, provides the online system 110 with insight that may help improve the online services of the online system 110. For example, the video publishing website may have access to a significant number of reviews by online users that when analyzed, provides the video publishing website with insight into affinities of the users of the website.

The online system 110 may request the document analysis system 130 to perform one or more tasks on the documents of the online system 110 that may be used to improve online services, gain insight into users of the online system 110, and the like. For example, the video publishing website may request the document analysis system 130 to perform sentiment classification on video reviews to identify positive or negative reviews for a particular video. Based on the classification results, the video publishing website may recommend videos similar to the particular video to users associated with the positive reviews. As another example, the video publishing website may request the document analysis system 130 to identify reviews similar in content to a particular review.

The document analysis system 130 receives requests to perform one or more tasks on documents of the online system 110. Often times, it is advantageous for the document analysis system 130 to determine document embeddings that represent documents as numerical vectors in latent space. Document embeddings allow the document analysis system 130 to automatically characterize documents with respect to properties such as structure, content, and sentiment of the document without the need for human analysis, which may require a significant amount of resources. The distance between a pair of document embeddings may indicate a degree of similarity between the corresponding pair of documents. For example, a document embedding for a document about baseball gloves may be closer to a document embedding for a document about baseball bats than a document embedding for a document about jewelry making.

In one embodiment, the document analysis system 130 trains a machine-learned document embedding model configured to receive a set of word embeddings corresponding to an ordered set of words in a document and generate the document embedding for the document. Each word embedding is a representation of the corresponding word as a numerical vector in a latent space. In one embodiment, the document embedding generated by the document embedding model represents prediction of a set of words that follow the last word in the ordered set of words of the document. Thus, the distance between a pair of document embeddings may indicate a degree of similarity between the corresponding pair of documents with respect to the prediction of the set of words that follow the last word in each respective document.

During the inference process, the document analysis system 130 generates document embeddings for one or more documents using the document embedding model, and may perform a variety of tasks based on the generated embeddings. Specifically, for a given document $D_k$, the document analysis system 130 identifies the set of word embeddings for the ordered set of words of the document. The set of word embeddings may be predetermined and identified from a lookup table, or may be generated by applying a word embedding model to the ordered set of words. The document analysis system 130 generates the document embedding $v^k$ by applying the document embedding model to the set of word embeddings for the document. The document analysis system 130 may perform various tasks, such as document classification or information retrieval, based on the generated document embeddings.

Figure 2:
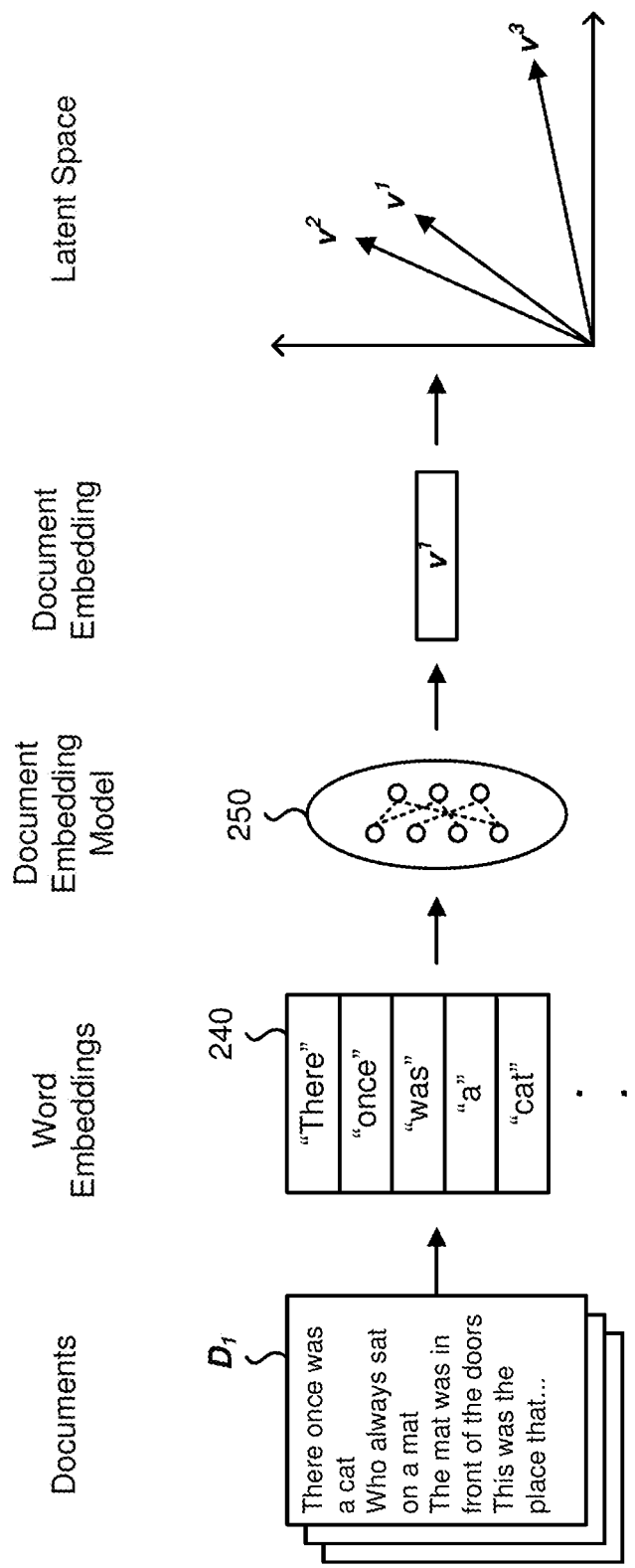
FIG. 2 illustrates an example inference process for a document embedding model, in accordance with an embodiment.

FIG. 2 illustrates an example inference process for a document embedding model, in accordance with an embodiment. FIG. 2 shows a collection of documents $D_k$, k=1, 2, 3, ... each having an ordered set of words. As an example, document $D_1$ contains an ordered set of words "There", "once", "was", and so on. The document analysis system 130 identifies a set of word embeddings 240 for the ordered set of words. The document analysis system 130 applies a document embedding model 250 to the set of word embeddings 240 to generate the document embedding $v^1$ for document $D_1$. Document embeddings $v^2$, $v^3$, ... can also be generated for other documents $D_2$, $D_3$, ... in the collection. FIG. 2 shows the document embeddings $v^1$, $v^2$, $v^3$ in a latent space as numerical vector representations of documents $D_1$, $D_2$, $D_3$. As shown by the distance between the document embeddings, document $D_1$ has a greater degree of similarity with document $D_2$ than document $D_3$.

Returning to the block diagram of FIG. 1, the document analysis system 130 trains a set of parameters of the document embedding model using a training corpus of documents to reduce a loss function. In one embodiment, the loss function includes a prediction loss that represents a difference between estimated document embeddings generated by applying the document embedding model to a first subset of words in each training document, and the corresponding word embeddings for a second subset of words subsequent to the first subset of words in the training document. By reducing the prediction loss, the document embedding model learns a document embedding for an ordered set of words that represents the collection of words likely to come after the ordered set of words. In another embodiment, the loss function additionally includes a negative word loss that represents a penalty for estimated document embeddings that represent prediction of words that were not included in the respective training documents. By reducing the negative word loss, the document embedding is less likely to incorporate prediction of a set of words that were absent from the document.

The document analysis system 130 reduces the loss function by repeatedly iterating between a forward pass step and a backpropagation step. During the forward pass step, the document analysis system 130 samples a batch of training documents. The document analysis system 130 generates estimated document embeddings for a first subset of words in each training document by applying the document embedding model with an estimated set of parameters to the word embeddings for the first subset of words. During the backpropagation step, the document analysis system 130 determines the loss function based on word embeddings for the second subset of words subsequent the first subset of words in the training document and the estimated document embeddings. The document analysis system 130 updates the estimated set of parameters by backpropagating one or more error terms obtained from the loss function.

In one embodiment, the document analysis system 130 trains a document embedding model with a convolutional neural network (CNN) architecture. The CNN architecture of the document embedding model includes one or more convolutional layers, in which the output at a convolutional layer is generated by applying one or more kernels each associated with a set of weights to subsets of the input at the previous layer. The output indicates the presence of structural features in the input that are associated with the kernels of the convolutional layer.

The CNN architecture of the document embedding model allows the document analysis system 130 to overcome various difficulties of existing document embedding models. Specifically, existing embedding models may generate document embeddings based on very small sequences of words in the document that do not incorporate other long-range semantic relationships in the document. As another example, existing embedding models may require a significant amount of computational power during both the training and inference process due to the particular structure of the embedding models. By using a CNN architecture for the document embedding model, the document analysis system 130 can easily generate document embeddings in a computationally efficient manner that takes into account both short-range and long-range semantic relationships. Moreover, the CNN architecture can easily process variable-length documents that include a variable number of words.

In one embodiment, the document analysis system 130 jointly trains the word embedding model along with the document embedding model. Specifically, the word embedding model is configured to receive an encoded word and generate the word embedding for the word. The word embedding model can be used to learn the relationship between an encoded word and the word embedding for the word to reduce the loss function of the document embedding model.

Specifically, during the forward pass step, the document analysis system 130 generates the word embeddings for the first subset of words and the second subset of words in the training documents by applying the word embedding model with an estimated set of parameters to each encoded word. The word embeddings are used to generate the estimated document embeddings for the first subset of words. During the backpropagation step, the document analysis system 130 determines the loss function based on the word embeddings for the second subset of words. The document analysis system 130 updates the estimated set of parameters of the document embedding model and the word embedding model by backpropagating one or more error terms obtained from the loss function.

Figure 3:
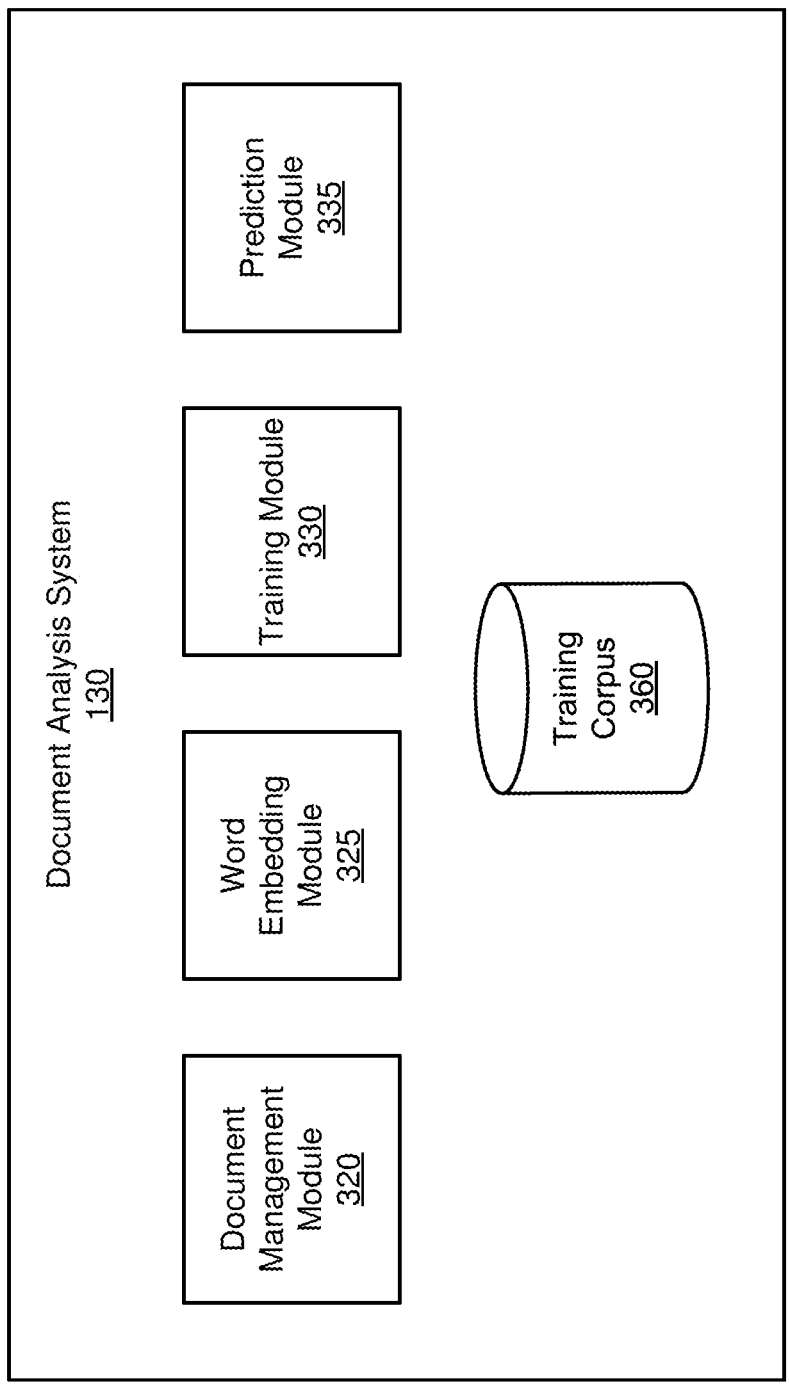
FIG. 3 is a block diagram of an architecture of a document analysis system, in accordance with an embodiment.

FIG. 3 is a block diagram of an architecture of the document analysis system 130, in accordance with an embodiment. The document analysis system 130 shown by FIG. 3 includes a document management module 320, a word embedding module 325, a training module 330, and a prediction module 335. The document analysis system 130 also includes a training corpus 360. In alternative configurations, different and/or additional components may be included in the document analysis system 130.

The document management module 320 manages the training corpus 360 of documents that are used to train a set of parameters of the document embedding model. The training corpus 360 contains a corpus of documents, in which the documents may be provided by the online system 110, or may be obtained by the document analysis system 130 from a separate source. Specifically, each training document $D_t$ of the training corpus 360 includes an ordered set of words $w^t_1$, $w^t_2$, $w^t_{|Dt|}$. In one embodiment, the document management module 320 identifies a first ordered subset of words $w^t_{j \in S1}$ and a second ordered subset of words $w^t_{j \in S2}$ subsequent the first subset of words for each training document $D_t$ of the corpus 360. For example, the first subset of words $w^t_{j \in S1}$ may include the first predetermined number of words in document $D_t$, while the second subset of words $w^t_{j \in S2}$ include the remaining words of the document.

In addition, the document management module 320 may also process the training documents according to the tasks requested by the online system 110. These may include, for example, labeling of documents for classification or regression tasks, extracting statistics from the documents, and the like that can be used to train models for performing these tasks. For example, the document management module 320 may categorize each training document $D_t$ according to an associated topic (e.g., action movie, romance movie, documentary) or sentiment (e.g., positive review, negative review) according to a classification task requested by the online system 110.

The word embedding module 325 determines word embeddings through a word embedding model configured to receive an encoded word $w_j$ and output the word embedding $\varphi(w_j)$ for the word. The word embedding represents the word in a latent space. The latent space of the word embedding may have the same dimensionality, i.e., same number of elements, as the document embeddings. The word embedding model may be trained with the document embedding model, or may be trained in a separate process. In one instance, the encoded vector for word $w_j$ is given by the one-hot encoded vector that represents a vocabulary of words obtained from, for example, the training documents of the corpus 360, in which the only the element corresponding to word $w_j$ has a non-zero value. For example, when a vocabulary of words for the training corpus 360 is the set {"forward," "backward," "left," "right"}, the word "right" may be encoded as the vector [0 0 0 1], in which the fourth element corresponding to the word has the only non-zero value. The word embedding module 325 may determine the encoded vector for word $w_j$ and generate the word embedding $\varphi(w_j)$ by applying the word embedding model to the encoded vector.

In one embodiment, the word embedding model is configured to receive an ordered set of words $w_{j \in S}$ and generate the set of corresponding word embeddings $\varphi(w_{j \in S})$ by applying the word embedding model to each word. The set of word embeddings $\varphi(w_{j \in S})$ may be represented by a matrix $\varphi(w_{j \in S}) = [\varphi(w_1) \varphi(w_2) \ldots \varphi(w_{|S|})]$, in which a width of the matrix corresponds to the size of each word embedding (m) and the length of the matrix scales with the number of words $|S|$ in the ordered set $w_{j \in S}$. In one instance, the word embedding module 325 processes the generated set of word embeddings to a fixed number k of words. Specifically, the word embedding module 325 may truncate the number of word embeddings when the number of words $|S|$ at the input is greater than k. Alternatively, the word embedding module 325 may pad the set of word embeddings with zero vectors 0 of width m if the number of words $|S|$ is smaller than k.

The training module 330 trains the document embedding model configured to receive a set of word embeddings for an ordered set of words and generate a document embedding representing a prediction of words the follow the last word in the ordered set. In one embodiment, the document embedding model is a neural network model with a series of parameterized functions. Specifically, the document embedding $\upsilon_{1:S}$ for a set of word embeddings $\varphi(w_{j \in S}) = \varphi(w_1)$, $\varphi(w_2)$, $\varphi(w_{|S|})$ may be given by:

$$\upsilon_S = f_d(\phi)(w_{j \in S}); \theta_d)$$

where $f_d(\cdot)$ denotes the series of functions of the document embedding model associated with a set of parameters $\theta_d$.

The training module 330 determines the value of the parameters $\theta_d$ of the document embedding model by iteratively reducing a loss function. Initially, the training module 330 identifies word embeddings for the first subset of words and the second subset of words subsequent the first subset in each document of a batch of training documents. The set of word embeddings may be provided to the training module 330 along with the training documents themselves, or may be generated by the word embedding module 325.

The training module 330 iterates between a forward pass step and a backpropagation step at each iteration. During the forward pass step, the training module 330 generates estimated document embeddings by applying the document embedding model to the word embeddings for the first subset of words in each document. During the backpropagation step, the training module 330 determines the loss function based on the estimated document embeddings and the respective word embeddings for the second subset of words in each training document. The training module 330 updates the set of parameters $\theta_d$ of the document embedding model to reduce the loss function. The training module 330 may use gradient-based numerical optimization algorithms, such as batch gradient algorithms, stochastic gradient algorithms, and the like to reduce the loss function during the backpropagation step.

In one embodiment, the loss function includes a prediction loss. The prediction loss represents a distance between the estimated document embeddings generated during the forward pass step, and the word embeddings for the second subset of words in the batch of training documents. Specifically, the loss function may be given by:

$$L(\upsilon^t_{S1}, \phi(w^t_{j \in S2})) = \sum_{t \in T} \sum_{j \in S2} \log\left(\frac{1}{1 + \exp(-\phi(w^t_j)^T \upsilon^t_{S1})}\right)$$

where T is the batch of training documents sampled from the training corpus 360. Thus, the loss function is reduced when the estimated document embedding $\upsilon^t_{S1}$ generated by applying the document embedding model to the word embeddings for the first subset of words in document $D_t$ is closer to the word embeddings $\varphi(w^t_{j \in S2})$ for the second subset of words subsequent the first subset of words in the document.

In another embodiment, the loss function additionally includes a negative word loss that represents a penalty for generating an estimated document embedding that represents prediction of words that are not contained in the respective training document. Specifically, the loss function may be given by the summation of the prediction loss and the negative word loss:

$$L(\upsilon^t_{S1}, \phi(w^t_{j \in S2})) = \sum_{t \in T} \left( \sum_{j \in S2} \log\left(\frac{1}{1 + \exp(-\phi(w^t_j)^T \upsilon^t_{S1})}\right) - \sum_{w \notin D^t} \log\left(1 - \frac{1}{1 + \exp(-\phi(w)^T \upsilon^t_{S1})}\right) \right)$$

Thus, the loss function can also be reduced when the estimated document embedding $\upsilon^t_{S1}$ is farther away from the word embeddings $\varphi(w)$ for words that are not included in the respective training document $D_t$.

Figure 4:
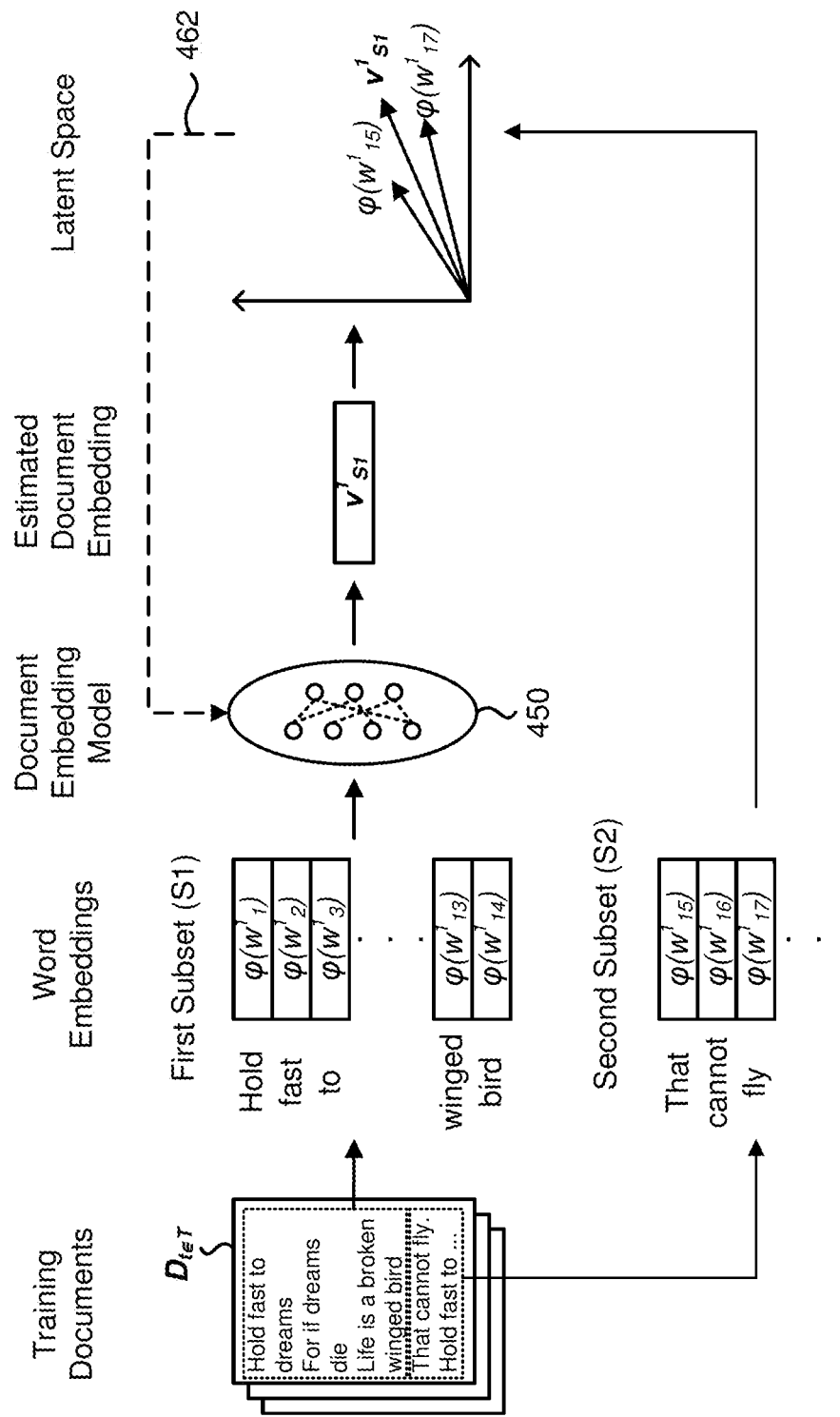
FIG. 4 illustrates an example training process for a document embedding model, in accordance with an embodiment.

FIG. 4 illustrates an example training process for a document embedding model, in accordance with an embodiment. FIG. 4 shows a batch of training documents $D_{t \in T}$. As an example, the document management module 320 identifies a first subset of words $w^1_{j \in S1}$ for document $D_1$ as the first 14 words of the document $W^1_1$="Hold," $w^1_2$="fast," . . . , $w^1_{14}$="to," and a second subset of words $w^1_{j \in S2}$ subsequent the first subset that as the remaining words of the document $w^1_{15}$="That," $w^1_{16}$="cannot" . . . . The training module 330 identifies the corresponding word embeddings for the first subset of words $\varphi(w^1_{1:14})$ and word embeddings for the second subset of words $\varphi(w^1_{15:|Dt|})$. The training module 330 may identify the word embeddings through the word embedding module 325.

During the forward pass step, the training module 330 generates the estimated document embeddings $\upsilon^1_{S1}$ for the first subset of words by applying the document embedding model 450 to the word embeddings for the first subset of words $\varphi(w^1_{j \in S1})$. The training module 330 may also generate estimated document embeddings for other training documents in the batch. During the backpropagation step, the training module 330 determines the loss function 462 based on the distances between estimated document embeddings and the word embeddings for the second subset of words in the batch. The training module 330 updates the set of parameters $\theta_d$ of the document embedding model 450 to reduce the loss function. As shown in FIG. 4, the loss function 462 is reduced such that the word embedding $\varphi(w^1_{15})$ for word $w^1_{15}$ in document $D_1$ and the word embedding $\varphi(w^1_{17})$ for word $w^1_{17}$ are closer to the estimated document embedding $\upsilon^1_{S1}$.

In one embodiment, the training module 330 trains a document embedding model with a CNN architecture. The CNN architecture of the document embedding model includes one or more convolutional layers. The output at a convolutional layer l is generated by applying one or more kernels $S^1_1, S^1_2, \ldots, S^1_{nl}$ each with their own set of parameters sequentially to subsets of the input at the previous layer l−1. Specifically, an element at layer l generated by applying kernel $S^l_i$ to a subset of the input at the previous layer indicates presence of a particular feature associated with the kernel $S^l_i$ in the input subset. The set of parameters of the kernels may be learned by iterating between the forward pass and backpropagation steps.

In one embodiment, the document embedding model may be configured to receive the set of word embeddings $\varphi(w_{j \in S})$ for an ordered set of words and generate an output at a convolutional layer by applying one or more kernels of size k×m to a sliding window of words embeddings. Specifically, the sliding window of word embeddings are sequences of word embeddings $\varphi(w_{j:j+k-1})$, j=1, 2, . . . of k words that each coincide with the dimensionality of the kernels. In practice, the width of the kernel k can be adjusted differently between ordered sets of words from different documents, and can correspond to any number of words. In one instance, the width of the kernel k may correspond to two or more words. The output at the convolutional layer may be represented as a feature map associated with a width that varies with the number of kernels for the convolutional layer, and a length that varies with the number of word embeddings at the input. Each element of the feature map may correspond to presence of a particular feature within a corresponding sequence of word embeddings in the ordered set of words $w_{j \in S}$.

The document embedding model may be configured to perform similar convolutional operations at subsequent convolutional layers of the model to generate a series of feature maps as the input data of word embeddings propagate through the network. Each feature map may be associated with a width that varies with the number of kernels used to generate the output at the layer, and a length that varies with the length of the input at the previous layer. Thus, the dimensionality of the feature maps may vary depending on the number of word embeddings that are received at the input. By performing a series of convolutional operations, the output at a subsequent convolutional layer of the model indicates presence of a particular feature within a longer sequence that encompasses the sequences of words associated with the corresponding inputs at previous layers. Thus, the document embedding model takes into account varying ranges of semantic context to generate the document embedding, in which features related to short range semantic relationships are identified at shallow layers of the network, and features related to long range semantic relationships are identified at deeper layers of the network.

Figure 5:
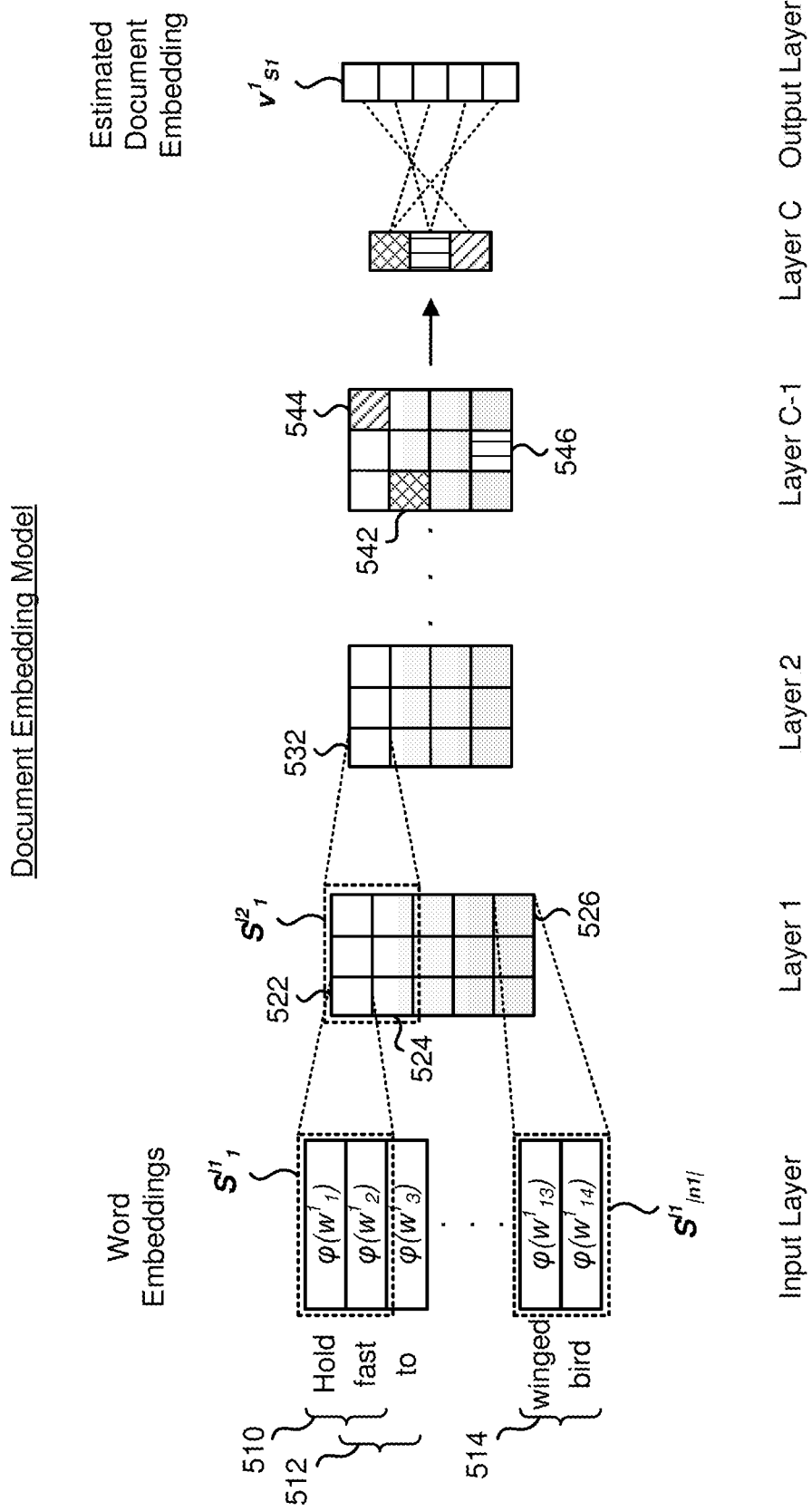
FIG. 5 illustrates an architecture of a document embedding model with a convolutional neural network (CNN) architecture, in accordance with an embodiment.

FIG. 5 illustrates an architecture of a document embedding model with a convolutional neural network (CNN) architecture, in accordance with an embodiment. The CNN architecture shown in FIG. 5 is configured to receive a set of word embeddings that correspond to word embeddings for the first ordered subset of words $\varphi(w^1_1), \varphi(w^1_2), \ldots, \varphi(w^1_{14})$ in document $D_1$ as shown in FIG. 4.

The output at layer 1, which is a convolutional layer, is generated by applying kernels $S^{l1}_1, S^{l1}_2, \ldots, S^{l1}_{n1}$ to a sliding window of word embeddings to perform one or more convolutional operations. In the example shown in FIG. 5, each kernel is applied to a sequence of two word embeddings at a time to generate the feature map at layer 1. However, in practice, each kernel can be applied to any sequence of words. In the example shown in FIG. 5, the number of rows (length) of the feature map at layer 1 vary with the number of word embeddings, while the number of columns (width) of the feature map vary with the number of kernels. Element 522 is generated by applying the kernel $S^{l1}_1$ to a first sequence 510 including the first and second word embeddings. Element 524 is generated by applying the kernel $S^{l1}_1$ to the second sequence 512 including the second and third word embeddings. Element 526 is generated by applying the last kernel $S^{l1}_{n1}$ to the last sequence 514.

The output at subsequent layer 2, which is also a convolutional layer, is generated by performing one or more convolutional operations on the feature map of layer 1. In the example shown in FIG. 5, the number of rows (length) of the feature map at layer 2 vary with the length of the input data at layer 1, while the columns (width) of the feature map vary with the number of kernels. Element 532 is generated by applying the kernel $S^{l2}_1$ to the subset including the first and second rows of the feature map at layer 1. The output at element 532 may indicate presence of a high-level feature identified from the combination of short-range features within a subset encompassing both sequences 510 and 512. The output at subsequent convolutional layers may be generated by performing similar convolutional operations to generate a series of feature maps along the network.

In one embodiment, the document embedding model may further include an aggregation layer, in which variable-length input at a previous layer is mapped to a fixed-length output at the aggregation layer through an aggregation operation. Specifically, by incorporating the aggregation layer within the network, the document embedding model can generate a document embedding of a fixed-length regardless of the number of word embeddings received by the model. The aggregation layer may be placed after one or more convolutional layers in the CNN architecture of the document embedding model. Thus, even though the dimensionality of the series of feature maps can vary according to the number of word embeddings in the input data, any variable-length feature map within the network is consequently mapped to a fixed-length output at the aggregation layer.

In one instance, the aggregation operation is performed on elements along the length of the feature map associated with a particular kernel. Specifically, the aggregation operation may aggregate the elements along a length of the feature map into a single value. Thus, the length of the resulting output at the aggregation layer corresponds to the number of kernels that are represented in the feature map. The aggregation operation may be one or a combination among a max function, a mean function, a median function, or any other function that can map a variable-length input to a fixed-length output. Subsequently, the document embedding model may be configured to generate the document embedding through one or more fully connected layers. Each element of a fully connected layer is generated by respectively applying a set of parameters to each element in the previous layer through a given function. The set of parameters of the fully connected layers may also be learned through iterating between the forward pass and backpropagation steps.

Returning to the example shown in FIG. 5, the output at layer C, which is an aggregation layer, is generated by performing an aggregation operation across the length of the feature map at the previous layer C-1. The resulting output at layer C is a fixed-length vector of three elements, corresponding to the number of kernels represented at layer C-1. Specifically, in the example of FIG. 5, the aggregation operation is a max function, in which the element having the maximum value along the length of the feature map for a given column is selected as an output of layer C. Element 542, associated with the first kernel $S^{IC-1}_1$ for layer C-1, has the maximum value along elements of the first column of the feature map, and is thus mapped to the first element of layer C. Similarly, elements 544 and 546 are respectively associated with the second kernel $S^{IC-1}_2$ and the third kernel $S^{IC-1}_3$, and are mapped to the second and third elements of layer C. The output layer containing the estimated document embedding $\upsilon^1_{1:14}$ is a fully connected layer associated with a set of parameters, in which each element is generated by applying a set of parameters to each element in layer C. Although the document embedding model shown in FIG. 5 includes a single fully connected layer, in practice, the document embedding model can include multiple fully connected layers as previously discussed.

Alternatively, the document embedding model may be configured to receive a set of word embeddings with a fixed number k of words. For example, the training module 330 may request the word embedding module 325 to generate word embeddings with the fixed number k of words for the first subset of words in each training document. The training module 330 may generate the estimated document embeddings during a forward pass step by applying the document embedding model to the sets of word embeddings each having a fixed number k of words. In this manner, the document embedding model is configured to generate a series of feature maps with the same dimensionality since the number of word embeddings for each input are fixed, even without an aggregation layer.

In one embodiment, the training module 330 jointly trains the word embedding model with the document embedding model. The document embedding model is coupled to the word embedding model to receive a set of word embeddings generated by the word embedding model. The document embedding model can generate the document based on the received set of word embeddings. In one embodiment, the embedding model is a neural network model associated with a series of parameterized functions. Specifically, the word embedding for word $w_j$ may be given by $\varphi(w_j; \theta_w)$ where $\theta_w$ is a set of parameters of the word embedding model.

The training module 330 jointly determines the value of the parameters $\theta_d$ of the document embedding model and the value of the parameters $\theta_w$ of the word embedding model by iteratively reducing the loss function. Initially, the word embedding module 325 determines the encoded vectors of the first subset of words $w^t_{j \in S1}$ and the second subset of words $w^t_{j \in S2}$ for each document in the training batch. During the forward pass step, the training module 330 determines a corresponding set of estimated word embeddings $\varphi(w^t_{j \in S1})$, $\varphi(w^t_{j \in S2})$ by applying the word embedding model to the encoded vectors. The training module 330 determines the estimated document embeddings for the first subset of words $w^t_{j \in S1}$ by applying the document embedding model to the estimated word embeddings for the first subset of words $\varphi(w^t_{j \in S1})$. During the backpropagation step, the training module 330 determines the loss function based on the estimated document embeddings and the estimated word embeddings for the second subset of words $\varphi(w^t_{j \in S2})$. The set of parameters $\theta_w$ of the word embedding model and the set of parameters $\theta_d$ of the document embedding model are updated to reduce the loss function.

Figure 6:
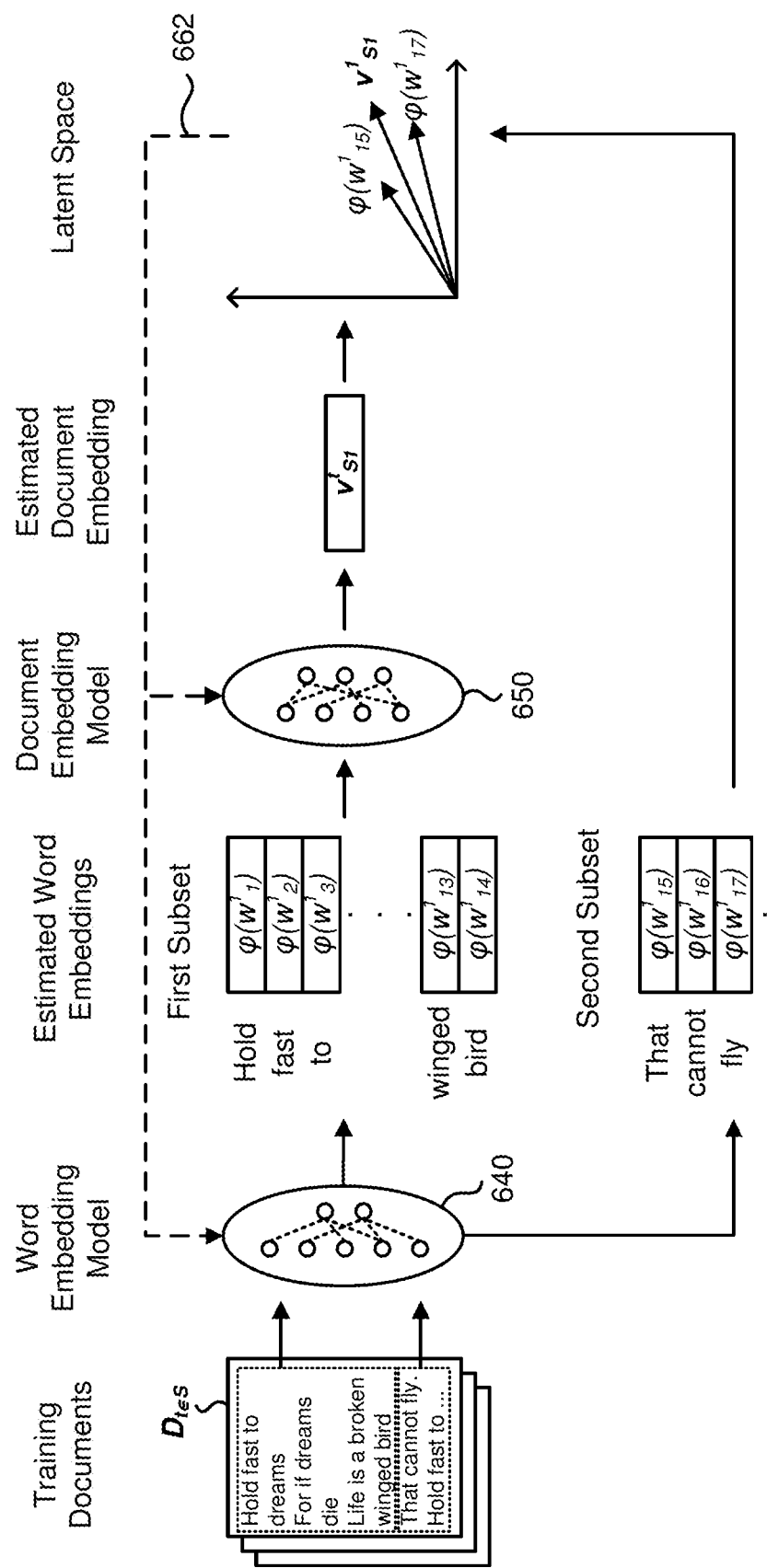
FIG. 6 illustrates an example training process for a document embedding model and a word embedding model, in accordance with an embodiment.

FIG. 6 illustrates an example training process for a document embedding model and a word embedding model, in accordance with an embodiment. The example training process is different from the training process shown in FIG. 4 in that a word embedding model 640 is coupled to the document embedding model 650. The word embedding module 325 determines the encoded vectors for each of the first subset of words in the training batch. The training module 330 determines the set of word embeddings for the first subset of words $\varphi(w^1_{S1})$ and the second subset of words $\varphi(w^1_{S2})$ by applying the word embedding model 640 to the encoded vectors. The training module 330 generates the estimated document embedding $\upsilon^1_{S1}$ by applying the document embedding model 650 to the estimated word embeddings. During the backpropagation step, the training module 325 determines the loss function 662 based on the estimated document embeddings and the estimated word embeddings for the second subset of words in each document of the training batch. As shown in FIG. 6, both the set of parameters of the document embedding model 650 and the word embedding model 640 are updated to reduce the loss function.

Returning to FIG. 3, the prediction module 335 receives requests to perform one or more tasks on documents of the online system 110. The prediction module 335 may perform the tasks based on document embeddings identified for the documents. Specifically, for each document $D_k$ containing an ordered set of words, the prediction module 335 determines a set of word embeddings $\varphi(w^k) = \varphi(w^k_1)$, $\varphi(w^k_2), \ldots, \varphi(w^k_{|Dk|})$ for the document through the word embedding module 325. Alternatively, a set of predetermined word embeddings may be provided to the prediction module 335 along with the document. The prediction module 335 applies the machine-learned document embedding model to the set of word embeddings to generate a document embedding for the document. Specifically, the set of corresponding word embeddings $\varphi(w^k_1)$, $\varphi(w^k_2), \ldots, \varphi(w^k_{|Dk|})$ are propagated through the document embedding model, and the output layer of the model are determined as the document embedding $v^k$ for the document.

The prediction module 335 performs one or more tasks based on the generated document embeddings for the documents of the online system 110. For example, the request may be an information retrieval request to identify documents similar to the document of the query. The prediction module 335 may identify the document embedding for the query, and retrieve similar documents that have document embeddings within a predetermined distance from the document embedding for the query. As another example, the request may be a classification request to classify documents into one or more categories. The prediction module 335 may identify document embeddings for the documents, and train a machine-learned model to perform the classification task based on the document embeddings.

Figure 7:
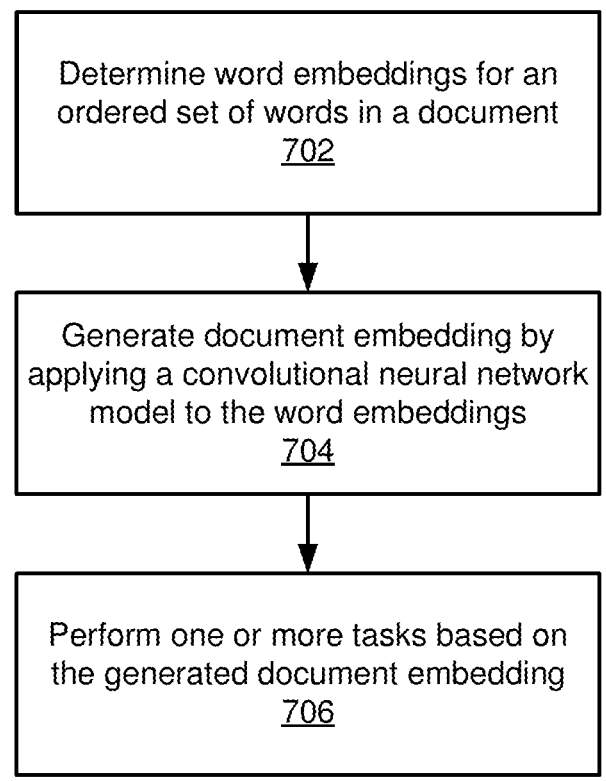
FIG. 7 illustrates a method for performing one or more tasks with a set of document embeddings, in accordance with an embodiment.

FIG. 7 illustrates a method for performing one or more tasks with a set of document embeddings, in accordance with an embodiment. The document analysis system 130 determines 702 a corresponding word embedding for each of an ordered set of words for a document. The word embedding for the word represents the word in a latent space. The document analysis system 130 generates 704 the document embedding by applying a convolutional neural network model to the word embeddings of the document. The document embedding represents the document in a latent space and represents a prediction of a set of words that follow the last word in the document. The document analysis system 130 performs 706 one or more tasks based on the generated set of document embeddings.

Figure 8:
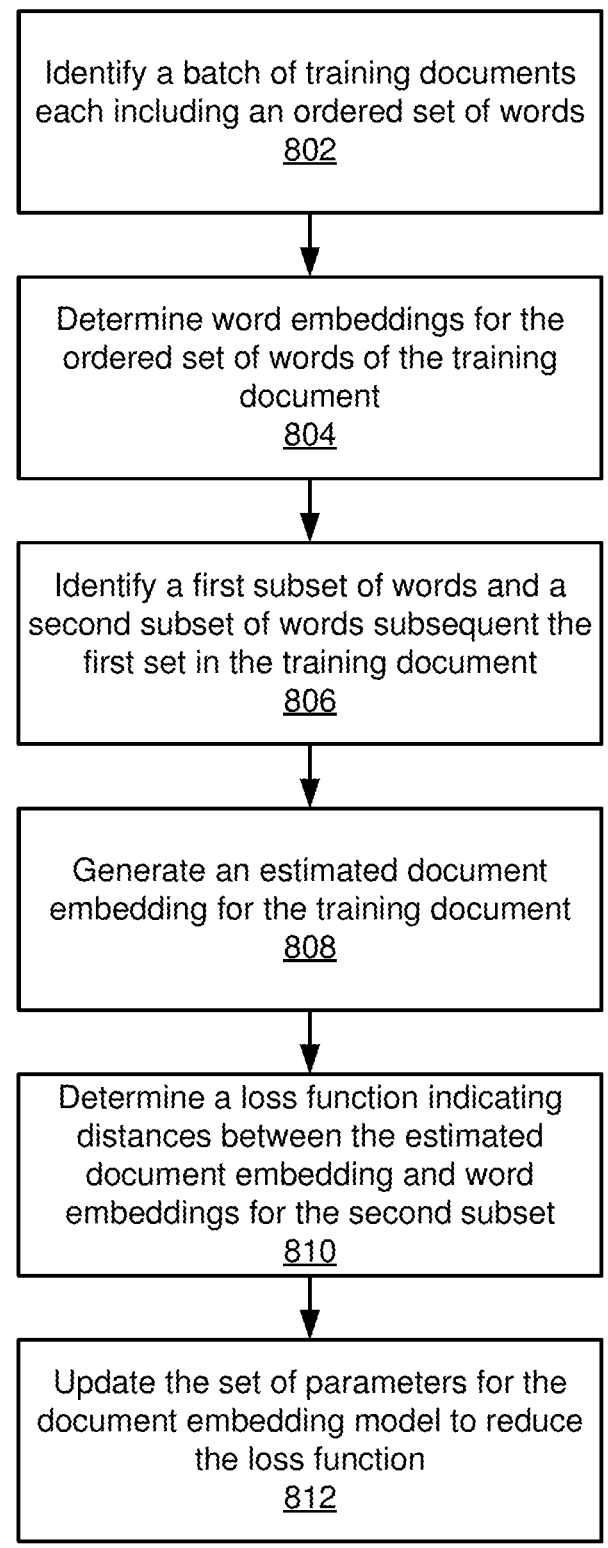
FIG. 8 illustrates a method for training a document embedding for generating a document embedding.

FIG. 8 illustrates a method for training a document embedding for generating a document embedding. The document analysis system 130 identifies 802 a batch of training documents. Each training document includes an ordered set of words. For each training document, the document analysis system 130 determines 804 a corresponding word embedding for each of an ordered set of words in the training document. The document analysis system identifies 806 a first subset of words and a second subset of words subsequent the first subset in the training document. The document analysis system 130 generates 808 an estimated document embedding by applying the document embedding model with an estimated set of parameters to the word embeddings for the first subset of words. The document analysis system 130 determines 810 a loss function indicating distances between the estimated embedding and the word embeddings for the second subset of words. The set of parameters for the document embedding model are updated 812 to reduce the loss function.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of training a document embedding model for generating a document embedding for a corresponding document, the method comprising:
   identifying a batch of training documents, each training document including an ordered set of words;
   for each training document in the batch of training documents:
      determining, for each of the ordered set of words included in the training document, a corresponding word embedding for a word that represents the word in a latent space;
      identifying a first subset of words in the training document and a second subset of words in the training document subsequent to the first subset of words;
      generating an estimated document embedding for the training document by applying the document embedding model with an estimated first set of parameters to the word embeddings for the first subset of words; and
      determining a loss function indicating distances between the estimated document embedding and the word embeddings for the second subset of words; and updating the first set of parameters for the document embedding model to reduce the loss function relative to the estimated first set of parameters of the document embedding model.

2. The method of claim 1, determining the loss function further comprises:
identifying a negative set of words that are not included in the training document; and
determining, for each of the negative set of words, a corresponding word embedding for the word, wherein the loss function further indicates distances between the estimated embedding and the word embeddings for the negative set of words.

3. The method of claim 1, wherein determining the word embeddings for the ordered set of words comprises:
applying, for each of the ordered set of words, a word embedding model with an estimated second set of parameters to the word, and wherein the method further comprises updating the second set of parameters for the word embedding model to reduce the loss function relative to the estimated second set of parameters of the word embedding model.

4. The method of claim 1, wherein a dimensionality of the latent space of the word embedding is same as a dimensionality of a latent space of the estimated document embedding.

5. The method of claim 1, wherein the document embedding model has a convolutional neural network architecture, and wherein generating the estimated document embedding further comprises generating a fixed vector with a fixed-number of elements at an aggregation layer placed after a series of convolutional layers, wherein the fixed vector is generated by performing an aggregation operation to an input at a layer before the aggregation layer.

6. The method of claim 5, wherein the layer before the aggregation layer is a convolutional layer associated with a feature map, and wherein the fixed vector is generated by performing the aggregation operation to elements of the feature map associated with each particular kernel of the convolutional layer.

7. The method of claim 5, wherein generating the document embedding further comprises generating outputs at one or more fully connected layers of the convolutional neural network architecture that are placed after the aggregation layer, the outputs generated by:
for each fully connected layer, generating an output at the fully connected layer by applying a set of parameters to each input at another layer before the fully connected layer.

8. A non-transitory computer-readable medium containing instructions for execution on a processor, the instructions comprising:
identifying a batch of training documents, each training document including an ordered set of words;
for each training document in the batch of training documents:
determining, for each of the ordered set of words included in the training document, a corresponding word embedding for a word that represents the word in a latent space;
identifying a first subset of words in the training document and a second subset of words in the training document subsequent to the first subset of words;
generating an estimated document embedding for the training document by applying a document embedding model with an estimated first set of parameters to the word embeddings for the first subset of words; and
determining a loss function indicating distances between the estimated document embedding and the word embeddings for the second subset of words; and
updating the first set of parameters for the document embedding model to reduce the loss function relative to the estimated first set of parameters of the document embedding model.

9. The computer-readable medium of claim 8, wherein determining the loss function further comprises:
identifying a negative set of words that are not included in the training document; and
determining, for each of the negative set of words, a corresponding word embedding for the word, wherein the loss function further indicates distances between the estimated embedding and the word embeddings for the negative set of words.

10. The computer-readable medium of claim 8, wherein determining the word embeddings for the ordered set of words comprises:
applying, for each of the ordered set of words, a word embedding model with an estimated second set of parameters to the word, and wherein the instructions further comprise updating the second set of parameters for the word embedding model to reduce the loss function relative to the estimated second set of parameters of the word embedding model.

11. The computer-readable medium of claim 8, wherein a dimensionality of the latent space of the word embedding is same as a dimensionality of a latent space of the estimated document embedding.

12. The computer-readable medium of claim 8, wherein the document embedding model has a convolutional neural network architecture, and wherein generating the estimated document embedding further comprises generating a fixed vector with a fixed-number of elements at an aggregation layer placed after a series of convolutional layers, wherein the fixed vector is generated by performing an aggregation operation to an input at a layer before the aggregation layer.

13. The computer-readable medium of claim 12, wherein generating the document embedding further comprises generating outputs at one or more fully connected layers of the convolutional neural network architecture that are placed after the aggregation layer, the outputs generated by:
for each fully connected layer, generating an output at the fully connected layer by applying a set of parameters to each input at another layer before the fully connected layer.

14. A machine-learned document embedding model stored on a non-transitory computer-readable medium, wherein the document embedding model is manufactured by a process comprising:
identifying a batch of training documents, each training document including an ordered set of words;
for each training document in the batch of training documents:
determining, for each of the ordered set of words included in the training document, a corresponding word embedding for a word that represents the word in a latent space;
identifying a first subset of words in the training document and a second subset of words in the training document subsequent to the first subset of words;

generating an estimated document embedding for the training document by applying the document embedding model with an estimated first set of parameters to the word embeddings for the first subset of words; and determining a loss function indicating distances between the estimated document embedding and the word embeddings for the second subset of words;

updating the first set of parameters for the document embedding model to reduce the loss function relative to the estimated first set of parameters of the document embedding model; and storing the set of parameters on the computer-readable medium as parameters of the document embedding model.

15. The machine-learned document embedding model of claim 14, wherein determining the loss function further comprises:

identifying a negative set of words that are not included in the training document; and determining, for each of the negative set of words, a corresponding word embedding for the word, wherein the loss function further indicates distances between the estimated embedding and the word embeddings for the negative set of words.

16. The machine-learned document embedding model of claim 14, wherein determining the word embeddings for the ordered set of words comprises:

applying, for each of the ordered set of words, a word embedding model with an estimated second set of parameters to the word, and wherein the process further comprises updating the second set of parameters for the word embedding model to reduce the loss function relative to the estimated second set of parameters of the word embedding model.

17. The machine-learned document embedding model of claim 14, wherein a dimensionality of the latent space of the word embedding is same as a dimensionality of a latent space of the estimated document embedding.

18. The machine-learned document embedding model of claim 14, wherein the document embedding model has a convolutional neural network architecture, and wherein generating the estimated document embedding further comprises generating a fixed vector with a fixed-number of elements at an aggregation layer placed after a series of convolutional layers, wherein the fixed vector is generated by performing an aggregation operation to an input at a layer before the aggregation layer.

19. The machine-learned document embedding model of claim 18, wherein the layer before the aggregation layer is a convolutional layer associated with a feature map, and wherein the fixed vector is generated by performing the aggregation operation to elements of the feature map associated with each particular kernel of the convolutional layer.

20. The machine-learned document embedding model of claim 18, wherein generating the document embedding further comprises generating outputs at one or more fully connected layers of the convolutional neural network architecture that are placed after the aggregation layer, the outputs generated by:

for each fully connected layer, generating an output at the fully connected layer by applying a set of parameters to each input at another layer before the fully connected layer.

* * * * *